(12) United States Patent
Vance et al.

(10) Patent No.: US 10,377,469 B2
(45) Date of Patent: Aug. 13, 2019

(54) NON-CONTACT POWER SUPPLY AND DATA TRANSFER ON AERIAL VEHICLES

(71) Applicant: The Boeing Company, Chicago, IL (US)

(72) Inventors: Jonathan B. Vance, University City, MO (US); Scott R. Johnston, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 295 days.

(21) Appl. No.: 15/061,658

(22) Filed: Mar. 4, 2016

(65) Prior Publication Data

US 2017/0253319 A1 Sep. 7, 2017

(51) Int. Cl.
*B64C 13/50* (2006.01)
*B64C 39/02* (2006.01)
*B64F 5/10* (2017.01)

(52) U.S. Cl.
CPC ............ *B64C 13/50* (2013.01); *B64C 39/024* (2013.01); *B64F 5/10* (2017.01); *B64C 2201/104* (2013.01); *B64D 2221/00* (2013.01)

(58) Field of Classification Search
CPC ... B64D 2221/00; B64C 39/024; B64C 13/50; B64C 2201/104; B64F 5/10
See application file for complete search history.

(56) References Cited

U.S. PATENT DOCUMENTS

| 5,082,207 | A | * | 1/1992 | Tulinius | B64C 3/44 244/76 R |
|---|---|---|---|---|---|
| 6,222,443 | B1 | * | 4/2001 | Beeson | B60D 1/065 307/10.1 |
| 7,048,234 | B2 | * | 5/2006 | Recksiek | B64C 13/503 244/213 |
| 7,072,620 | B2 | * | 7/2006 | Tran | H01Q 9/0442 343/703 |
| 8,371,536 | B2 | * | 2/2013 | Soenarjo | B64D 15/12 242/388.1 |
| 8,495,945 | B1 | * | 7/2013 | Kirchner | F41F 3/055 89/1.8 |
| 8,686,590 | B2 | * | 4/2014 | Bugash | B64D 45/0005 307/9.1 |
| 9,059,508 | B2 | * | 6/2015 | Worl | H01Q 1/287 |
| 9,107,325 | B1 | * | 8/2015 | Ihn | G06F 3/05 |
| 9,114,872 | B2 | * | 8/2015 | Marques | B64C 13/503 |
| 9,199,516 | B2 | * | 12/2015 | Jansen | B60C 23/041 |
| 9,755,679 | B1 | * | 9/2017 | Wobak | H04B 5/0031 |
| 2006/0289696 | A1 | * | 12/2006 | Hanlon | B64C 13/503 244/35 R |

(Continued)

FOREIGN PATENT DOCUMENTS

EP 2410077 A1 * 1/2012 ............ C23C 18/06

*Primary Examiner* — Pinping Sun
(74) *Attorney, Agent, or Firm* — Toler Law Group, P.C.

(57) ABSTRACT

An aircraft includes a first structure that includes a first surface and a first coil conformed to, or embedded within, the first surface. The aircraft includes a second structure that includes a second surface and a second coil conformed to, or embedded within, the second surface. The second structure is configured to couple to the first structure such that the first coil is aligned with the second coil to enable inductive coupling between the first coil and the second coil.

20 Claims, 6 Drawing Sheets

(56) References Cited

U.S. PATENT DOCUMENTS

| | | | |
|---|---|---|---|
| 2008/0060539 A1* | 3/2008 | Foley | B41F 33/0009 101/484 |
| 2008/0157603 A1* | 7/2008 | Baarman | H02J 7/025 307/104 |
| 2008/0164840 A1* | 7/2008 | Kato | H01F 27/2804 320/108 |
| 2009/0184877 A1* | 7/2009 | Bommer | H01Q 1/007 343/708 |
| 2011/0222225 A1 | 9/2011 | Kessler et al. | |
| 2012/0139358 A1 | 7/2012 | Teggatz et al. | |
| 2012/0235506 A1* | 9/2012 | Kallal | H02J 5/005 307/104 |
| 2012/0262002 A1* | 10/2012 | Widmer | H02J 5/005 307/104 |
| 2013/0062959 A1* | 3/2013 | Lee | H04B 5/0031 307/104 |
| 2013/0081245 A1 | 4/2013 | Vavrina et al. | |
| 2013/0099585 A1* | 4/2013 | Von Novak | H01F 38/14 307/104 |
| 2014/0015329 A1* | 1/2014 | Widmer | G01D 5/2006 307/104 |
| 2014/0091638 A1* | 4/2014 | Azancot | H01F 38/14 307/104 |
| 2014/0225451 A1* | 8/2014 | Lafontaine | G01R 25/00 307/104 |
| 2014/0252813 A1* | 9/2014 | Lee | H02J 17/00 297/180.12 |
| 2014/0340035 A1* | 11/2014 | Maekawa | H01F 27/365 320/108 |
| 2015/0022011 A1* | 1/2015 | Kim | H04B 5/0037 307/104 |
| 2015/0035376 A1* | 2/2015 | Baarman | H02J 5/005 307/104 |
| 2015/0083850 A1* | 3/2015 | Moser | B64C 9/16 244/99.2 |
| 2015/0200550 A1* | 7/2015 | Maekawa | B60L 11/182 307/104 |
| 2015/0203197 A1* | 7/2015 | Bajekal | H02J 5/005 416/1 |
| 2015/0246730 A1* | 9/2015 | Khozikov | B64D 15/20 244/134 D |
| 2015/0326061 A1* | 11/2015 | Davison | H02J 7/0044 320/108 |
| 2016/0006263 A1* | 1/2016 | Shichino | H02J 5/005 307/104 |
| 2016/0006288 A1* | 1/2016 | Wagman | H01F 38/14 307/104 |
| 2016/0118810 A1* | 4/2016 | Park | H02J 5/005 307/104 |
| 2016/0159233 A1* | 6/2016 | Kim | B60L 11/182 320/108 |
| 2016/0181824 A1* | 6/2016 | Hui | B60L 53/12 307/104 |
| 2016/0221441 A1* | 8/2016 | Hall | B60L 1/00 |
| 2016/0226314 A1* | 8/2016 | Lee | H04B 5/0031 |
| 2016/0238731 A1* | 8/2016 | Chopra | H02J 7/0042 |
| 2016/0261137 A1* | 9/2016 | Riehl | H02J 7/025 |
| 2016/0336992 A1* | 11/2016 | Schedelbeck | H04L 5/1438 |
| 2017/0244270 A1* | 8/2017 | Waters | H02J 7/025 |
| 2017/0264102 A1* | 9/2017 | Maekawa | B60L 11/182 |

* cited by examiner

NON-CONTACT POWER SUPPLY AND DATA TRANSFER ON AERIAL VEHICLES

FIELD OF THE DISCLOSURE

The disclosure generally relates to power and data transfer on aerial vehicles.

BACKGROUND

Aircraft, such as unmanned aerial vehicles (UAVs), may include modular components. For example, a UAV may be configured with a swappable wing that enables the wing to be detached from a fuselage and a replacement wing to be attached to the fuselage. The different modules of the modular aircraft may include electrical components, and some modules may not include a local power source. For example, wing flaps may be powered using a motor driven by a power source on the fuselage. Power, control, and feedback may be provided to components on modules using electrical cable/wire connectors, fiber optic connectors, or other mechanical interconnects to connect electrical components on one module to a power source in a different module. However, the electrical cable/wire connectors, fiber optic connectors, or other mechanical interconnects are susceptible to corrosion, damage, dust, debris, moisture, and other environmental factors that may deleteriously impact their performance.

SUMMARY

In a particular embodiment, an aircraft includes a first structure that includes a first surface and a first coil conformed to, or embedded within, the first surface. The aircraft further includes a second structure that includes a second surface and a second coil conformed to, or embedded within, the second surface. The second structure is configured to couple to the first structure such that the first coil is aligned with the second coil to enable inductive coupling between the first coil and the second coil.

In a particular embodiment, a method includes mating a first surface of a first structure of an aerial vehicle and a second surface of a second structure of the aerial vehicle such that a first coil conformed to the first surface or embedded within the first structure is aligned with a second coil conformed to the second surface or embedded within the second structure. The method further includes causing a signal to be applied to the first coil such that the first coil and the second coil are inductively coupled.

In a particular embodiment, a method of manufacturing an aerial vehicle includes forming a first coil conformed to a first surface of, or embedded within, a first structure of an aerial vehicle using a first direct write technique. The method further includes forming a second coil conformed to a second surface of, or embedded within, a second structure of the aerial vehicle using a second direct write technique. The second structure is configured to couple to the first structure such that the first coil is aligned with the second coil to enable inductive coupling between the first coil and the second coil.

The features, functions, and advantages that have been described can be achieved independently in various embodiments or may be combined in yet other embodiments, further details of which are disclosed with reference to the following description and drawings.

DETAILED DESCRIPTION

Particular embodiments of the present disclosure are described below with reference to the drawings. In the description, common features are designated by common reference numbers throughout the drawings.

Figure 1:
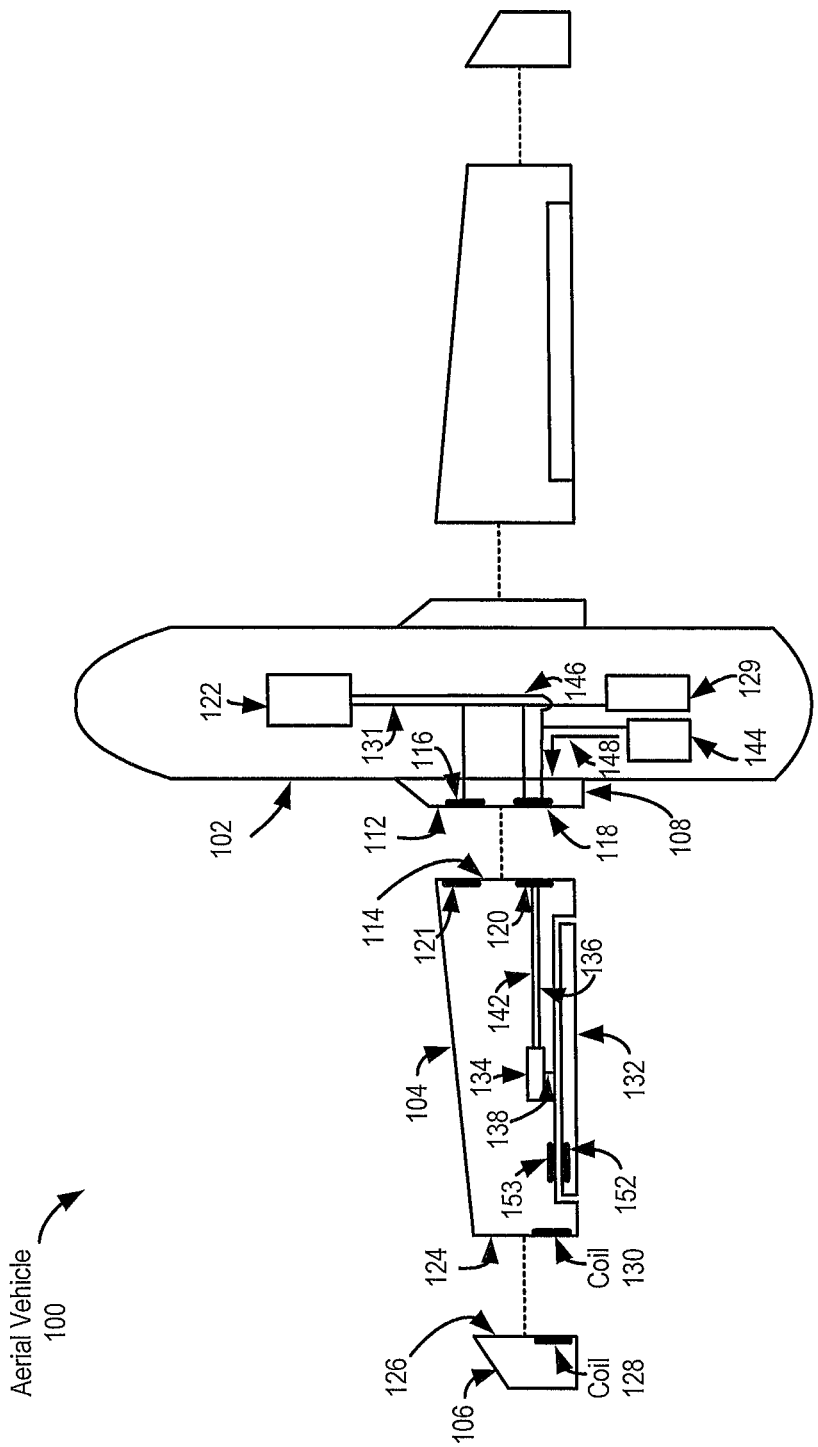
FIG. 1 is a top view of an example of an unassembled modular aerial vehicle including a first structure having a first surface and a second structure having a second surface.

Referring to FIG. 1, a top view of a modular aerial vehicle (e.g., an aircraft) 100 is depicted. The aerial vehicle 100 may include a manned aerial vehicle or an unmanned aerial vehicle (UAV).

The aerial vehicle 100 may include a first structure that includes a first surface and one or more first coils conformed to the first surface and/or embedded within the first surface. For example, the first structure on the aerial vehicle 100 may include or may correspond to a fuselage 102 (which may include a wing base 108). In this example, the first surface may include or may correspond to a surface 112 of the fuselage 102 (e.g., of the wing base 108). In another example, the first structure may include or may correspond to a wing 104. In this example, the first surface may include or may correspond to a surface 124 of the wing 104. The first surface may be non-planar.

When the first structure includes or corresponds to the fuselage 102, the one or more first coils may include a coil 116 and/or a coil 118. When the first structure includes or corresponds to the wing 104, the one or more first coils may include a coil 130 or a coil 153. Each coil of the one or more first coils may be a conductive coil (e.g., an inductor). In some examples, each coil of the one or more first coils may be a spiral inductor. Each coil of the one or more first coils may be formed of or may include a conductive material as described in more detail below. In some examples, at least one of the one or more first coils may include a three-dimensional (3D) geometry.

The aerial vehicle 100 further includes a second structure that includes a second surface and one or more second coils conformed to the second surface. For example, the second structure on the aerial vehicle 100 may include or may correspond to the wing 104. In this example, the second surface may include or may correspond to a surface 114 of the wing 104. In another example, the second structure may include or may correspond to a winglet 106. In this example, the second surface may include a surface 126 of the winglet 106. In another example, the second structure may include a moveable control surface, such as a flap 132 or a rudder. The second surface may be non-planar. Although the wing 104 and the winglet 106 are shown as examples of the second structure, the second structure may include other structures, such as an engine, a sensor pod, a radio, an antenna, etc.

When the second structure includes or corresponds to the wing 104, the one or more second coils may include a coil 120 and/or a coil 121. When the second structure includes or corresponds to the moveable control surface, the one or more second coils may include a coil 152. When the second structure includes or corresponds to the winglet 106, the one or more second coils may include a coil 128. Each coil of the one or more second coils may be a conductive coil (e.g., an inductor). In some examples, each coil of the one or more second coils may be a spiral inductor. Each coil of the one or more second coils may be formed of or may include a conductive material. In some examples, at least one of the one or more second coils may include a three-dimensional (3D) geometry.

Additionally, a first coil of the one or more first coils and a second coil of the one or more second coils may have a predetermined number of turns so as to tune the first coil and second coil to have a matching resonant frequency, in which the first coil may have the same resonant frequency as the second coil or a resonant frequency that is a multiple of the second coil. Accordingly, the first coil and second coil may, for example, have a number of turns that corresponds to a resonant frequency that is common to the first coil and second coil. The second structure is coupled to the first structure such that the first coil and second coil are aligned, which may be an axial alignment of the centerlines of the first coil and second coil.

For example, the coil 118 (e.g., a "first coil") and the coil 120 (e.g., a "second coil") may have a predetermined number of turns so as to tune the first coil 118 and the second coil 120 to have a matching resonant requency, in which the first coil 118 has the same resonant frequency as the second coil 120 or a resonant frequency that is a multiple of the second coil 120. In this example, the first coil 118 and the second coil 120 may, for example, have a number of turns that corresponds to a resonant frequency that is common to the first coil 118 and second coil 120. In this example, the second structure (e.g., the wing 104) is coupled to the first structure (e.g., the fuselage 102) such that the first coil 118 and second coil 120 are aligned, which may be an axial alignment of the centerlines of the first coil 118 and the second coil 120.

As another example, the coil 116 (e.g., a "first coil") and the coil 121 (e.g., a "second coil") may have a predetermined number of turns so as to tune the first coil 116 and the second coil 121 to have a matching resonant requency, in which the first coil 116 has the same resonant frequency as the second coil 121 or a resonant frequency that is a multiple of the second coil 121. In this example, the first coil 116 and the second coil 121 may, for example, have a number of turns that corresponds to a resonant frequency that is common to the first coil 116 and second coil 121. In this example, the second structure (e.g., the wing 104) is coupled to the first structure (e.g., the fuselage 102) such that the first coil 116 and second coil 121 are aligned, which may be an axial alignment of the centerlines of the first coil 116 and the second coil 121.

As another example, the coil 130 (e.g., a "first coil") and the coil 128 (e.g., a "second coil") may have a predetermined number of turns so as to tune the first coil 130 and the second coil 128 to have a matching resonant requency, in which the first coil 130 has the same resonant frequency as the second coil 128 or a resonant frequency that is a multiple of the second coil 128. In this example, the first coil 130 and the second coil 128 may, for example, have a number of turns that corresponds to a resonant frequency that is common to the first coil 130 and second coil 128. In this example, the second structure (e.g., the winglet 106) is coupled to the first structure (e.g., the wing 104) such that the first coil 130 and second coil 128 are aligned, which may be an axial alignment of the centerlines of the first coil 130 and the second coil 128.

As another example, the coil 153 (e.g., a "first coil") and the coil 128 (e.g., a "second coil") may have a predetermined number of turns so as to tune the first coil 153 and the second coil 152 to have a matching resonant requency, in which the first coil 153 has the same resonant frequency as the second coil 152 or a resonant frequency that is a multiple of the second coil 152. In this example, the first coil 153 and the second coil 152 may, for example, have a number of turns that corresponds to a resonant frequency that is common to the first coil 153 and second coil 152. In this example, the second structure (e.g., the flap 132) is coupled to the first structure (e.g., the wing 104) such that the first coil 153 and second coil 152 are aligned, which may be an axial alignment of the centerlines of the first coil 153 and the second coil 152.

The second structure on the aerial vehicle 100 is configured to couple (e.g., mechanically couple) to the first structure on the aerial vehicle 100 such that the one or more first coils are aligned with the one or more seconds coil to enable inductive coupling between pairs of corresponding coils of the one or more first coils and the one or more second coils. For example, when the first structure includes or corresponds to the fuselage 102 and the second structure includes or corresponds to the wing 104, the wing 104 may be configured to mechanically couple to the fuselage 102 such that the coil 118 (e.g., a first coil) is aligned with the coil 120 (e.g., a second coil) to enable inductive coupling between the coil 118 and the coil 120 and/or such that the coil 116 (e.g., a first coil) is aligned with the coil 121 (e.g., a second coil) to enable inductive coupling between the coil 116 and the coil 120. As another example, when the first structure includes or corresponds to the wing 104 and the second structure includes or corresponds to the winglet 106, the winglet 106 may be configured to mechanically couple to the wing 104 such that the coil 128 (e.g., a first coil) is aligned with the coil 130 (e.g., a second coil) to enable inductive coupling between the coil 128 and the coil 130. As another example, when the first structure includes or corresponds to the wing 104 and the second structure includes or corresponds to the flap 152, the flap 152 may be configured to mechanically couple to the wing 104 such that the coil 153 is aligned with the coil 152 to enable inductive coupling between the coil 153 and the coil 152.

The inductive coupling enables inductive power transfer from the first structure on the aerial vehicle 100 to the second structure on the aerial vehicle 100. For example, the aerial vehicle 100 may further include a power supply 129 in the first structure (e.g., the fuselage 102). The power supply 129 may be electrically coupled to at least one of the one or more first coils 116 and 118 via an electrical cable/wire. For example, the power supply 129 may be connected to the coil 116 and to the coil 118 via the electrical cable/wire 131. In this example, the coil 118 is configured to inductively transfer power to the coil 120 when power from the power supply 129 is supplied to the coil 118 and the second structure (e.g., the wing 104) is coupled to the fuselage 102. Alternatively or additionally, the coil 116 is configured to inductively transfer power to the coil 121 when power from the power supply 129 is supplied to the coil 116 and the second structure (e.g., the wing 104) is coupled to the fuselage 102.

The power inductively transferred from the first structure to the second structure may be used to power one or more components on the second structure. For example, the second structure may include the wing 104, which may include a flap 132 coupled to a motor and flap control circuitry 134 (e.g., via a conductive trace 138). The motor and flap control circuitry 134 may be electrically coupled to the coil 120 via a conductive trace 136. During operation, the motor and flap control circuitry 134 may be configured to extend and retract the flap 132 using power (e.g., power inductively transferred to the coil 120 from the coil 118) provided to the motor and flap control circuitry 134 from the coil 120 via the conductive trace 136. Thus, one or more electrical components on the second structure may be powered using power that is inductively transferred to a coil on the second structure from a coil on the first structure.

The inductive coupling between the one or more first coils and the one or more second coils may enable data transfer from the first structure to the second structure. For example, the aerial vehicle 100 may further include a transmitter 144 in the first structure (e.g., the fuselage 102). The transmitter 144 may be configured to modulate a carrier signal having a frequency corresponding to a coupling frequency of a pair of corresponding coils (e.g., the coil 118 and the coil 120) with a modulating signal that includes data to generate a modulated signal (e.g., a data signal) 148. The transmitter 144 may be electrically coupled to the coil 118 via an electrical cable/wire to supply the data signal 148 to the coil 118. For example, the transmitter 144 may be connected to the coil 118 via the electrical cable/wire 146 and the data signal 148 may be supplied to the coil 118 via the electrical cable/wire 146. In this example, the coil 118 may be configured to inductively transfer the data from the data signal 148 to the coil 120 when the data signal 148 is applied to the coil 118 and the second structure (e.g., the wing 104) is coupled to the fuselage 102.

The data that is inductively transferred from the first structure to the second structure may be used to control components on the second structure. For example, the second structure may include the wing 104, which may include the flap 132 coupled to the motor and flap control circuitry 134 (e.g., via the conductive trace 138). The motor and flap control circuitry 134 may be electrically coupled to the coil 120 via a conductive trace 142. During operation, the motor and flap control circuitry 134 may be configured to extend and retract the flap 132 responsive to the data (e.g., inductively transferred to the coil 120 from the coil 118) provided to the motor and flap control circuitry 134 from the coil 120 via the conductive trace 142. Thus, one or more electrical components on the second structure may be controlled based on data that is inductively transferred to a second coil on the second structure from a first coil on the first structure.

Alternatively or additionally, the inductive coupling between the one or more first coils and the one or more second coils may enable data transfer from the second structure to the first structure. For example, the second structure may include a sensor (such as a de-icing sensor) and a transmitter. The transmitter on the second structure may receive data from the sensor and may be configured to modulate a carrier signal having a frequency corresponding to a coupling frequency of a pair of coils (e.g., the coil 120 and the coil 118) with a modulating signal that includes data from the sensor on the second structure to generate a modulating signal (e.g., a second data signal). The second data signal may be supplied to the coil 120, which may inductively transfer the data from the second data signal to the coil 118 when the second data signal is applied to the coil 120 and the second structure (e.g., the wing 104) is coupled to the fuselage 102. In some examples, the transmitter in the second structure may be powered using power supplied from the first structure via inductive coupling as described above.

In some examples, the first structure and the second structure may be formed using an additive manufacturing process. In this example, the one or more first coils and/or the one or more second coils may be formed using direct write techniques that are integrated into an additive manufacturing process flow to form the first structure or the second structure. Forming the one or more first coils or the one or more second coils using one or more direct write techniques integrated into an additive manufacturing process flow may enable the one or more first coils or the one or more second coils to be embedded within the corresponding structure and/or to be conformal to a surface of a corresponding structure.

For example, the one or more first coils or the one or more second coils may be embedded within a corresponding structure using successive additive manufacturing processes. For example, multiple direct writes (of a first direct write technique) may be performed during successive additive manufacturing steps to embed the one or more first coils within the first structure. Additionally or alternatively, multiple direct writes (of a second direct write technique) may be performed during successive additive manufacturing steps to embed the one or more first coils within the second structure. As another example, the one or more first coils may be formed on the first surface using a direct write technique (e.g., a first direct write technique) and the one or more second coils may be formed on the second surface using a direct write technique (e.g., a second direct write technique).

In some examples, the first direct write technique is the same technique as the second direct write technique. In other examples, the first direct write technique is a different technique than the second direct write technique. In some examples, the first direct write technique or the second direct write technique may include a Plasma Flame Spray (PFS) direct write technique. PFS enables a metal (e.g., copper) or a ceramic to be electrically liquefied for application on the first structure and/or on the second structure. Alternatively or additionally, the first direct write technique or the second direct write technique may include a Jetted Atomized Deposition (JAD) direct write technique. JAD enables a metal or a polymer to be placed on the first structure or the second structure in a manner similar to an ink jet printer and subsequently hardened. Additionally or alternatively, the first direct write technique or the second direct write technique may include an extrusion style direct write technique and/or one or more screen printing techniques.

Figure 2:
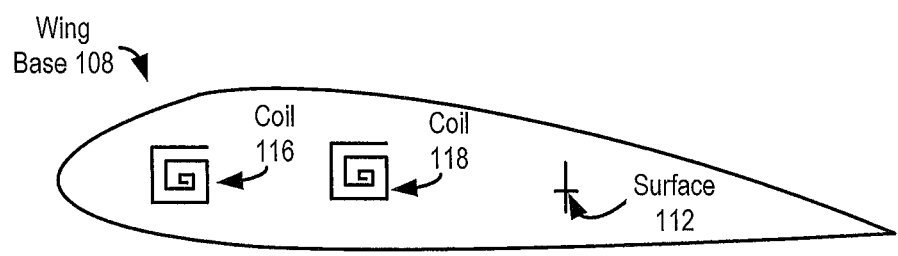
FIG. 2 is a view of the first surface of FIG. 1.
Figure 3:
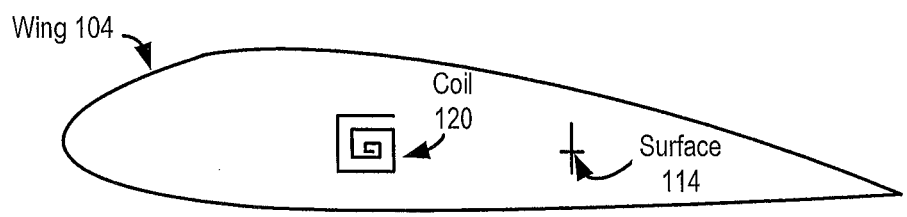
FIG. 3 is a view of the second surface of FIG. 1.

The additive manufacturing process (e.g., the first direct write technique and/or the second direct write technique) may include forming the one or more first coils and/or the one or more second coils by forming one or more coiling conductive traces directly on a surface of a structure such that the one more conductive traces conform to the shape of the surface of the structure. For example, FIG. 2 illustrates a view of the wing base 108 of FIG. 1 with the surface 112 exposed. In this example, the first direct write technique may include forming the one or more first coils (e.g., the one or more first coils 116 and 118) by forming coiling conductive traces corresponding to the one or more first coils 116 and 118 on the surface 112 such that the one or more first coils 116 and 118 conform to the shape of the surface 112 at the location at which the conductive traces are formed. As another example, FIG. 3 illustrates an end of the wing 104 with the surface 114 exposed. In this example, the second direct write technique may include forming the one or more second coils (e.g., the coil 120) by forming a coiling conductive trace on the surface 114 such that the coil 120 conforms to the shape of the surface 114 at the location at which the conductive trace is formed.

As described above, the first surface and/or the second surface may be non-planar. Thus, at least one of the one or more first coils and/or at least one of the one or more second coils may be non-planar. Using the additive process enables the one or more first coils and/or the one or more second coils to be conformed to corresponding non-planar surfaces.

In some examples, the one or more first coils are hermetically sealed. In some examples, the one or more first coils may be hermetically sealed using a direct write technique to apply an epoxy, ceramic, or other polymeric material over the one or more first coils to prevent gas contact. Alternatively or additionally, in some examples, the one or more second coils are hermetically sealed. In some examples, the one or more second coils may be hermetically sealed using a direct write technique to apply an epoxy, ceramic, or other polymeric material over the one or more second coils to prevent gas contact. Hermetically sealing the one or more first coils and/or the one or more second coils may protect the first and/or second coils from corrosion or other environmental factors.

The aerial vehicle 100 of FIG. 1 may further include a processor 122 coupled to at least one of the one or more first coils. For example, the first structure may include the fuselage 102 and the one or more first coils may include the coil 118 and the coil 116.

The processor 122 may be configured to detect a parameter associated with a received signal. The received signal may correspond to a feedback signal or a time-varying signal.

For example, the processor 122 may be configured to detect a parameter associated with a feedback signal transmitted by one or more second coils and received by the one or more first coils. The parameter associated with the feedback signal may be indicative of whether the first structure and the second structure are properly assembled (e.g., mated and/or aligned). To illustrate, the parameter associated with the feedback signal may correspond to an amount of attenuation of the feedback signal received by the one or more first coils. In this example, the feedback signal received by the one or more first coils may have a first power when the second structure is properly mated and aligned with the first structure. Alternatively or additionally, the feedback signal received by the one or more second coils may have a second power when the second structure is improperly mated or aligned with the first structure (e.g., due to greater attenuation experienced as a result of increased distance or misalignment between the one or more first coils and the one or more second coils). Thus, the processor 122 may be configured to detect a parameter (e.g., an amount of attenuation of the feedback signal) associated with the feedback signal.

The processor 122 may be configured to determine whether the first structure and the second structure are properly assembled based on the parameter associated with the feedback signal. For example, the second structure may be misaligned or there may be an unintentional gap between the second structure and the first structure causing the feedback signal transmitted by the one or more first coils to experience more attenuation when the first structure and the second structure are improperly assembled than when the first structure and the second structure are properly assembled. In this example, the processor 122 may determine that the first structure and the second structure are improperly mated or misaligned when the amount of attenuation of the feedback signal satisfies a threshold or is sufficiently different than a baseline attenuation or by comparing a current attenuation level to pre-determined attenuation levels (e.g., in a look up table).

For example, the baseline attenuation may be an average amount of attenuation over the last X number of flights. The processor 122 may detect an amount of attenuation during a flight and compare the attenuation to the average attenuation. The processor 122 may determine that the structures are improperly mated or misaligned (e.g., due to improper assembly or failing joint or interface health) based on the difference between the detected attenuation and the average attenuation satisfying a threshold. The difference may be detected after initial assembly or re-configuration, during a flight operation, and/or between flight operations.

As another example, the processor 122 may include a look up table (LUT) indicating attenuation levels corresponding to improper mating or misalignment (e.g., due to improper assembly or failing joint or interface health) and attenuation levels corresponding to proper assembly. Upon detecting the attenuation of the feedback signal as described above, the processor 122 may compare the attenuation to the LUT and determine whether the attenuation level corresponds to improper assembly. The comparison may be performed after initial assembly or re-configuration, during a flight operation, and/or between flight operations.

Thus, the processor 122 may detect a parameter associated with a feedback signal and may determine whether the first structure and the second structure are properly assembled, mated, or aligned (e.g., may determine a joint or interface health) based on the parameter associated with the feedback signal.

As another example, the received signal may correspond to a time-varying signal transmitted by the one or more second coils and received by the one or more first coils. In this example, the one or more first coils or the one or more second coils may be configured to inductively transmit a time-varying signal having a particular frequency that is indicative of a configuration of the first structure or the second structure. The processor 122 may be configured to determine a configuration of the second structure based on the particular frequency.

To illustrate, the aerial vehicle 100 may be adapted to receive wings that have different wing configurations (e.g., a first wing or a second wing). For example, the first wing may include electrical components that the second wing does not (such as a de-icing system). In this example, the first wing may be configured to transmit a time-varying signal having a first particular frequency via at least one of the one or more second coils on the wing 104 to the one or more first coils on the fuselage 102. Alternatively or additionally, the second wing may be configured to transmit a time-varying signal having a second particular frequency via at least one of the one or more second coils on the wing 104 to the one or more first coils on the fuselage 102. The processor 122 may process the signal received by the one or more first coils to determine a frequency of the time-varying signal transmitted by the one or more second coils. The processor 122 may determine that the wing 104 corresponds to the first wing when the processor 122 determines that the transmitted signal has the first particular frequency and may determine that the wing 104 corresponds to the second wing when the processor 122 determines that the transmitted signal has the second particular frequency. Thus, the aerial vehicle 100 may be configured to detect or determine a configuration of the second structure based on a frequency of a time-varying signal transmitted from the second structure to the first structure.

Additionally or alternatively, the processor 122 may be configured to detect a value of a parameter associated with the one or more first coils. A value of the parameter associated with the one or more first coils may be indicative of a configuration of the second structure. For example, when the parameter associated with the one or more first coils has a first value, the second structure may have a first configuration, and when the parameter has a second value, the second structure may have a second configuration.

In some examples, the parameter associated with the one or more first coils may be a parameter indicative of whether the one or more first coils are inductively coupled to a corresponding coil (of one or more second coils) on the second structure. For example, the parameter associated with the one or more first coils may correspond to an effective impedance (or a resonant frequency). In this example, the one or more first coils may have a first effective impedance when the one or more first coils are inductively coupled to a corresponding coil (of one or more second coils) on the second structure. Alternatively or additionally, the one or more first coils may have a second effective impedance when the one or more first coils are not inductively coupled to a corresponding coil (of one or more second coils) on the second structure. The processor 122 may be configured to determine a configuration of the second structure based on whether the one or more first coils have the first effective impedance or the second effective impedance.

To illustrate, the aerial vehicle 100 may be adapted to receive wings that have different wing configurations (e.g., a first wing or a second wing). For example, the first wing may include electrical components that the second wing does not (such as a de-icing system). In this example, the first wing may include more coils than the second wing so that the first wing can receive power and/or control signals for the additional components on the first wing. In this example, the first wing may include one or more second coils including the coil 120 and the coil 121 (which may be a corresponding coil for the coil 116). Additionally, in this example, the second wing may include one or more second coils including the coil 120 and may not include a corresponding coil for the coil 116 (e.g., the second wing may not include the coil 121). In this example, the processor 122 may detect a configuration of the wing 104 based on the effective impedances of the one or more first coils 118 and 116.

For example, the processor 122 may detect a first effective impedance of the coil 118 when the wing 104 corresponds to the first wing or to the second wing because the coil 118 is inductively coupled to a corresponding coil 120 when the wing 104 corresponds to the first wing and when the wing 104 corresponds to the second wing. The processor 122 may detect a first effective impedance of the coil 116 when the wing 104 corresponds to the first wing because the coil 116 is inductively coupled to the coil 121 (that is because the coil 116 is inductively coupled to a corresponding coil on the second structure). Alternatively, the processor 122 may detect the second effective impedance of the coil 116 when the wing 104 corresponds to the second wing because the coil 116 is not inductively coupled to a corresponding coil on the second structure (e.g., because the second wing does not include the coil 121). The processor 122 may be configured to detect the first wing based on the coil 116 having the first effective impedance or may be configured to detect the second wing based on the coil 116 having the second effective impedance. Thus, the aerial vehicle 100 may be configured to detect or determine a configuration of the second structure based on which coils of one or more first coils are inductively coupled to corresponding coils of one or more second coils of the second structure.

The aerial vehicle 100 may be configured to perform one or more operations based on detecting or determining a configuration of the second structure. For example, based on the determined configuration of the second structure, the processor 122 may set or adjust flight control parameters, may check for (and process) data from sensors on the second structure, or may set or adjust flight (e.g., performance) rules.

For example, based on the determined configuration of the second structure, the processor 122 may set or adjust flight control parameters. In an example, the second structure may include or may correspond to the wing 104 and may be configurable with different flaps. For example, the wing 104 may be configured in a first wing configuration with a first flap that is associated with a first roll rate and may be configured in a second wing configuration with a second flap that is associated with a second roll rate. In this example, the processor 122 may take the different roll rates into account when setting up flight control parameters for the aerial vehicle 100 based on the configuration of the wing 104 determined as described above. Thus, the processor 122 may set or adjust flight control parameters based on the determined configuration of the second structure.

As another example, the processor 122 may check for (and process) data from sensors on the second structure based on the configuration of the second structure. For example, the second structure may include or may correspond to the wing 104 and may be configurable with or without a de-icing system and a de-icing sensor. In this example, the processor 122 may be configured to determine whether the wing 104 is configured with a de-icing system and de-icing sensor based on the parameter as described above, and may look for sensor data (and process the sensor data) based on whether the wing 104 is determined to be configured to include the de-icing system and the de-icing sensor. For example, when the processor 122 determines that the wing 104 is configured with a de-icing sensor, the processor 122 may be configured to check for de-icing sensor signals and process data from the de-icing sensors. Alternatively, when the processor 122 determines that the wing 104 is not configured with a de-icing sensor, the processor 122 may be configured not to expend resources (e.g., memory and/or bus bandwidth) checking for de-icing sensor signals. Thus, the processor 122 may be configured to check for (and process) signals from the second structure based on the determined configuration of the second structure.

As another example, the processor 122 may be configured to set or adjust flight (e.g., performance) rules based on the configuration of the second structure. For example, the processor 122 may be configured to set or adjust flight rules based on an amount of power associated with the configuration of the second structure. For example, the second structure may include or may correspond to the wing 104. In this example, the wing 104 may be configured in a first configuration with components that require a first amount of power from the first structure and may be configured in a second configuration with components that require a second amount of power from the first structure. In this example, the processor 122 may be configured to set or adjust flight rules that will reserve a sufficient amount of power to power the components on the wing based on the determined configuration of the wing. For example, the first configuration may include components that require more power than the components of the second configuration. In this example, the processor 122 may adjust performance rules for the aerial vehicle 100 to limit performance (and thus expenditure of power) more when the wing 104 has the first wing configuration than when the wing 104 has the second configuration.

As another example, a first configuration of the wing 104 may have a first weight and a second configuration of the wing may have a second weight. The processor 122 may be configured to set a flight duration limit based on the determined wing configuration. For example, the processor 122 may determine that the wing 104 has the first wing configuration (associated with a heavier aircraft weight than the second configuration) and may thus set a flight duration limit for the aerial vehicle 100 having the first wing configuration that is shorter than a flight duration limit for the aerial vehicle 100 having the second wing configuration. Thus, the processor 122 may be configured to set or adjust flight rules based on the determined configuration of the second structure.

Thus, coils conformed to surfaces of a modular aircraft may be used to inductively transfer power and/or data to and/or from different structures of the aircraft. The coils conformed to the surfaces (e.g., and hermetically sealed) may not be subject to corrosion, damage, dust, debris, moisture and other environmental factors to which electrical cable/wire connectors, fiber optic connectors or other mechanical connects are susceptible.

Figure 4:
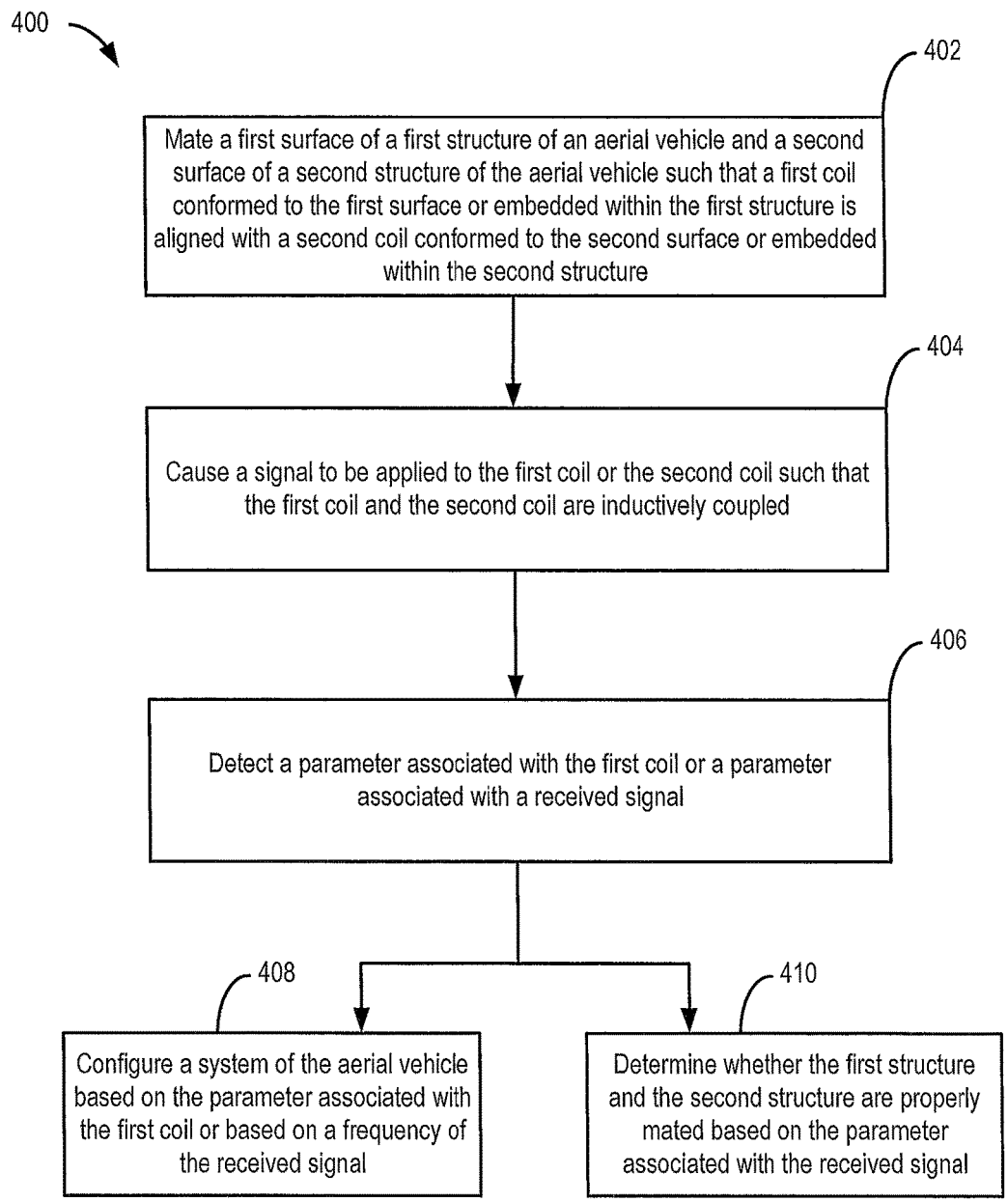
FIG. 4 is a flow chart of a method of assembling structures (of a modular aerial vehicle) that include inductively coupleable coils.

Referring to FIG. 4, a flow chart of a particular embodiment of a method 400 of assembling and using an aerial vehicle enabled to inductively transfer power and/or data between modular components of the aerial vehicle. The method 400 includes, at 402, mating a first surface of a first structure of an aerial vehicle and a second surface of a second structure of the aerial vehicle such that a first coil conformed to the first surface or embedded within the first structure is aligned with a second coil conformed to the second surface or embedded within the second structure.

The aerial vehicle may correspond to the aerial vehicle 100 of FIG. 1. In an example, the first structure may correspond to the fuselage 102. In this example, the first surface may correspond to the surface 112 and the first coil may correspond to the coil 116 or the coil 118. As another example, the first structure may correspond to the wing 104. In this example, the first surface may correspond to the surface 124 and the first coil may correspond to the coil 130.

In an example, the second structure may correspond to the wing 104. In this example, the second surface may correspond to the surface 114 and the second coil may correspond to the coil 120 or 121. As another example, the second structure may correspond to the winglet 106. In this example, the second surface may correspond to the surface 126 and the second coil may correspond to the coil 128. Although the wing 104 and the winglet 106 are shown as examples of the second structure, the second structure may include other structures, such as an engine, a sensor pod, a radio, an antenna, etc.

The first surface and the second surface may be mated using a friction fit. Alternatively or additionally, the first surface and the second surface may be mated using a mechanical fastener, or any other fastening or mating technique or means, to affix the second structure to the first structure.

The method 400 further includes, at 404, causing a signal to be applied to the first coil or to the second coil such that the first coil and the second coil are inductively coupled. For example, the signal may correspond to power from the power supply 129 of FIG. 1 that is applied to the first coil or may correspond to the data signal 148 of FIG. 1. As described above, applying the power from the power supply 129 to the first coil may cause power to be inductively transferred to the second coil. Alternatively or additionally, as described above, applying the data signal 148 to the first coil may cause the first coil to inductively transfer data of the data signal 148 to the second coil. Thus, the signal may correspond to power from a power supply and/or a data signal from a transmitter, and the power and/or data may be inductively transferred from the first coil to the second coil via inductive coupling between the first coil and the second coil.

As another example, the signal may be applied to the second coil, and the second coil may transmit the feedback signal described above in response to application of the signal to the second coil. As another example, the signal may be applied to the second coil, and the second coil may transmit the time-varying signal described above.

The method 400 may further include, at 406, detecting a parameter associated with the first coil. For example, the parameter may be indicative of whether the first coil is inductively coupled to a corresponding coil on the second structure. For example, as described above, the parameter may correspond to an effective impedance (or resonant frequency) of the first coil.

The method 400 may alternatively or additionally include, at 406, detecting a parameter associated with a received signal. For example, the received signal may be the feedback signal described above, and the parameter of the received feedback signal may be indicative of a distance or alignment quality between the first structure and the second structure as described above. For example, the parameter may correspond to the attenuation as described above. As another example, the received signal may be the time-varying signal described above, and the parameter of the received time-varying signal may be indicative of a configuration of the second structure as described above. For example, the parameter of the time-varying signal may correspond to the frequency of the time-varying signal as described above.

The method 400 may further include, at 408, configuring a system of the aerial vehicle based on the parameter associated with the one or more first coils or based on a frequency of the received signal. For example, as described above, the method may determine a configuration of the second structure based on the parameter associated with the one or more first coils (e.g., effective impedance) or based on the paramter associated with the time-varying signal (e.g., a frequency of the time-varying signal), and may perform one or more operations based on the determined configuration of the second structure. For example, as described above, based on the determined configuration of the second structure, the processor 122 may set or adjust flight control parameters (of a flight control system), may check for (and process) data from sensors on the second structure, or may adjust flight (e.g., performance) rules (of the flight control system).

The method 400 may alternatively or additionally include, at 410, determining whether the first structure and the second structure are properly mated or aligned based on the parameter associated wih the received signal. For example, the received signal may correspond to the feedback signal described above, and the parameter may correspond to an attenuation of the feedback signal. The processor 122 may determine whether the first structure and the second structure are properly mated or aligned based on the parameter associated with the feedback signal as described above.

Thus, the method 400 may include mating surfaces of structures of a modular aircraft that include coils conformed to the surfaces or embedded within the structures. The coils may be used to inductively transfer power and/or data to and/or from different structures of the aircraft. The coils conformed to the surfaces (e.g., and hermetically sealed) or embedded within the structures may not be subject to corrosion, damage, dust, debris, moisture and other environmental factors to which electrical cable/wire connectors, fiber optic connectors or other mechanical connects are susceptible.

Figure 5:
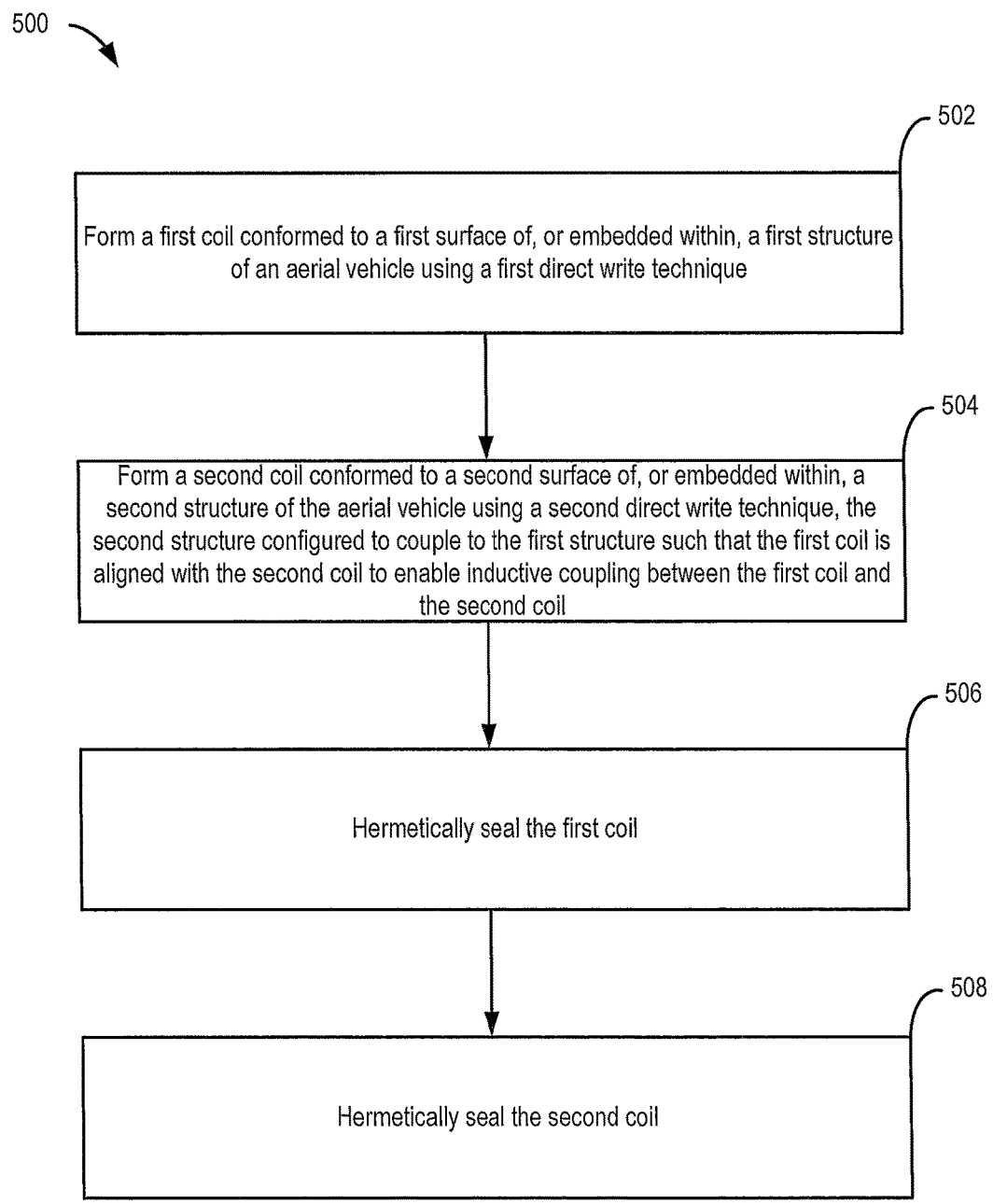
FIG. 5 is a flow chart of a method of forming inductively coupleable conformal coils on surfaces of structures of the aerial vehicle of FIG. 1.

Referring to FIG. 5, a flow chart of a particular embodiment of a method 500 of forming inductively coupleable conformal or embedded coils on surfaces of structures or within structures of an aerial vehicle is depicted. The method 500 includes, at 502, forming a first coil conformed to a first surface of, or embedded within, a first structure of an aerial vehicle using a first direct write technique.

The aerial vehicle may correspond to the aerial vehicle 100 of FIG. 1. In an example, the first structure may correspond to the fuselage 102. In this example, the first surface may correspond to the surface 112 and the first coil may correspond to the coil 116 or the coil 118. As another example, the first structure may correspond to the wing 104. In this example, the first surface may correspond to the surface 124 and the first coil may correspond to the coil 130. The first coil may be formed using a first direct write technique. For example, the first coil may be formed using a PFS or JAD direct write technique. Additionally or alternatively, the first coil may be formed using an extrusion style direct write technique and/or one or more screen printing techniques.

The method 500 further includes, at 504, forming a second coil conformed to a second surface of, or embedded within, a second structure of the aerial vehicle using a second direct write technique. In an example, the second structure may correspond to the wing 104. In this example, the second surface may correspond to the surface 114 and the second coil may correspond to the coil 120 or 121. As another example, the second structure may correspond to the winglet 106. In this example, the second surface may correspond to the surface 126 and the second coil may correspond to the coil 128. Although the wing 104 and the winglet 106 are shown as examples of the second structure, the second structure may include other structures, such as an engine, a sensor pod, a radio, an antenna, etc. The second coil may be formed using a second direct write technique. For example, the second coil may be formed using a PFS or a JAD direct write technique. Additionally or alternatively, the second coil may be formed using an extrusion style direct write technique and/or one or more screen printing techniques. In some examples, the first direct write technique is the same technique as the second direct write technique. Alternatively, the first direct write technique may be a different technique than the second direct write technique.

The second structure may be configured to couple to the first structure such that the first coil is aligned with the second coil to enable inductive coupling between the first coil and the second coil. For example, when the first structure includes the fuselage 102 and the second structure includes the wing 104, the wing 104 may be configured to mechanically couple to the fuselage 102 such that the coil 118 (e.g., a first coil) is aligned with the coil 120 (e.g., a second coil) to enable inductive coupling between the coil 118 and the coil 120 and/or such that the coil 116 (e.g., a first coil) is aligned with the coil 121 (e.g., a second coil) to enable inductive coupling between the coil 116 and the coil 120. As another example, when the first structure includes the wing 104 and the second structure includes the winglet 106, the winglet 106 may be configured to mechanically couple to the wing 104 such that the coil 128 (e.g., a first coil) is aligned with the coil 130 (e.g., a second coil) to enable inductive coupling between the coil 128 and the coil 130. The inductive coupling may enable inductive power transfer from the first structure to the second structure as described above. The inductive coupling may additionally or alternatively enable data transfer from the first structure to the second structure and/or from the second structure to the first structure as described above.

The method 500 may further include, at 506, hermetically sealing the first coil as described above. Additionally or alternatively, the method 500 may further include, at 508, hermetically sealing the second coil as described above. Hermetically sealing the first coil and/or the second coil may protect the first and/or second coil from corrosion or other environmental factors.

Thus, the method 500 may include forming coils conformed to surfaces of different structures or embedded within the structures of a modular aircraft. The coils may be used to inductively transfer power and/or data to and/or from different structures of the aircraft. The coils conformed to the surfaces (e.g., and hermetically sealed) of the structures or embedded within the structures may not be subject to corrosion, damage, dust, debris, moisture and other environmental factors to which electrical cable/wire connectors, fiber optic connectors or other mechanical connects are susceptible.

Figure 6:
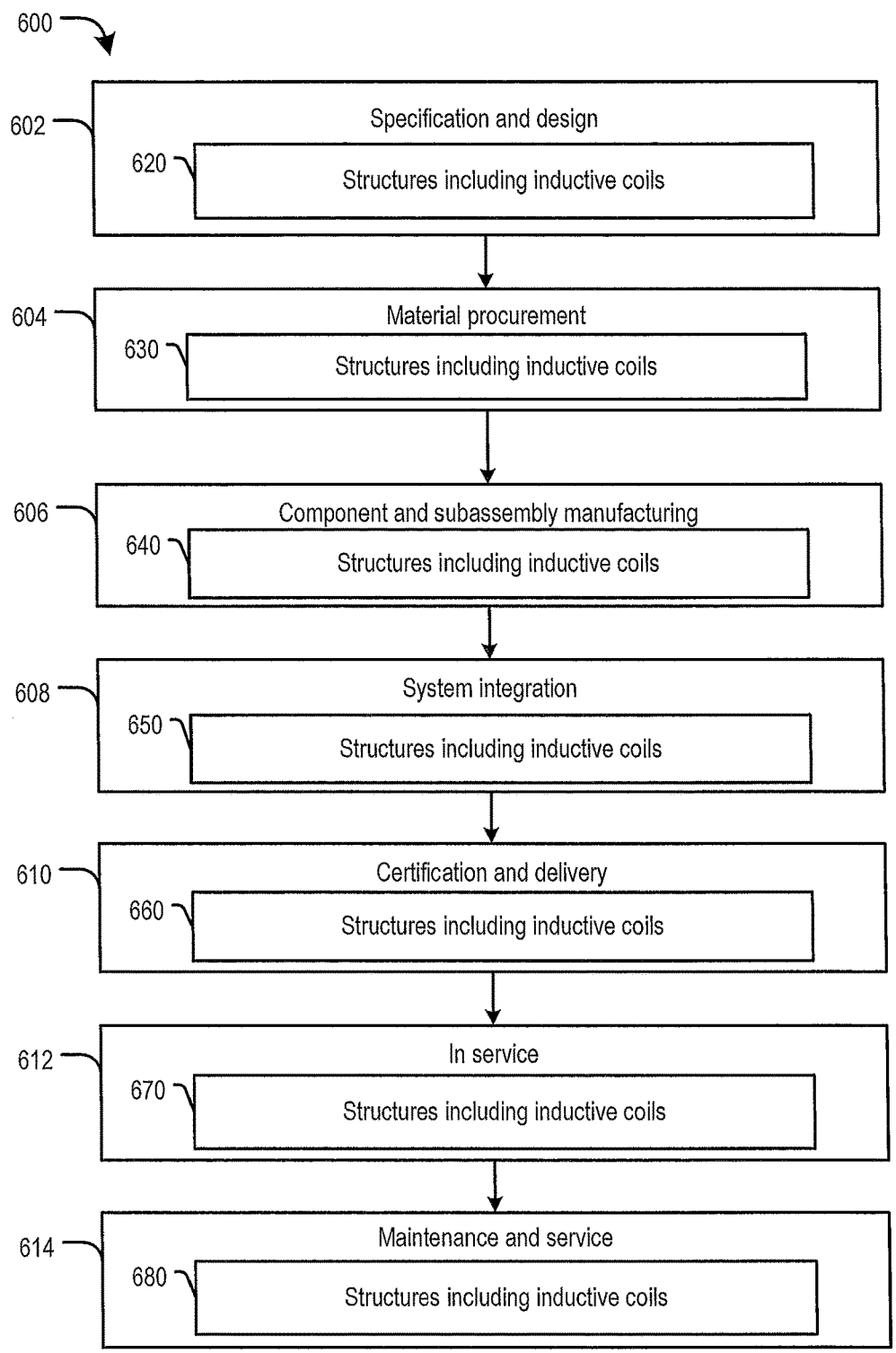
FIG. 6 is a flow chart illustrative of a life cycle of an aircraft that includes the first and second structure of FIG. 1.

Referring to FIG. 6, a flowchart illustrative of a life cycle of a vehicle including an ice detection system including first and second structures of a modular aerial vehicle (e.g., of the aerial vehicle 100 of FIG. 1) is shown and designated 600. During pre-production, the exemplary method 600 includes, at 602, specification and design of an aircraft, such as the aerial vehicle 100 of FIG. 1 or 702 described with reference to FIG. 7. During specification and design of the aircraft, the method 600 may include, at 620, specification and design of a first structure including a first coil conformed to a first surface of, or embedded within, the first structure and design of a second structure including a second coil conformed to a second surface of, or embedded within, the second structure.

In an example, the first structure may correspond to the fuselage 102 of FIG. 1. In this example, the first surface may correspond to the surface 112 and the first coil may correspond to the coil 116 or the coil 118. As another example, the first structure may correspond to the wing 104. In this example, the first surface may correspond to the surface 124 and the first coil may correspond to the coil 130.

In an example, the second structure may correspond to the wing 104. In this example, the second surface may correspond to the surface 114 and the second coil may correspond to the coil 120 or 121. As another example, the second structure may correspond to the winglet 106. In this example, the second surface may correspond to the surface 126 and the second coil may correspond to the coil 128. Although the wing 104 and the winglet 106 are shown as examples of the second structure, the second structure may include other structures, such as an engine, a sensor pod, a radio, an antenna, etc. The second structure may be configured to couple to the first structure such that the first coil is aligned with the second coil to enable inductive coupling between the first coil and the second coil as described above.

At 604, the method 600 includes material procurement. At 630, the method 600 includes procuring materials (such as conductive traces) for the first and second structures.

During production, the method 600 includes, at 606, component and subassembly manufacturing and, at 608, system integration of the aircraft. The method 600 may include, at 640, component and subassembly manufacturing (e.g., producing the first and second structures) of the aircraft and, at 650, system integration (e.g., coupling the first structure to the second structure such that the first coil is aligned with the second coil as described above). At 610, the method 600 includes certification and delivery of the aircraft and, at 612, placing the aircraft in service. Certification and delivery may include, at 660, certifying the inductive coupling between the first coil and the second coil by certifying reliability of inductive power transfer between the first structure and the second structure via the first coil and the second coil and/or by certifying reliability of data transfer between the first structure and the second structure via the first coil and the second coil. At 670, the method 600 includes placing the aircraft including the first and second structures in service. While in service by a customer, the aircraft may be scheduled for routine maintenance and service (which may also include modification, reconfiguration, refurbishment, and so on). At 614, the method 600 includes performing maintenance and service on the aircraft. At 680, the method 600 includes performing maintenance and service of the first and second structures. For example, maintenance and service of the first and second structures may include replacing one or more of the first structure, the second structure, or a combination thereof.

Each of the processes of the method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 7:
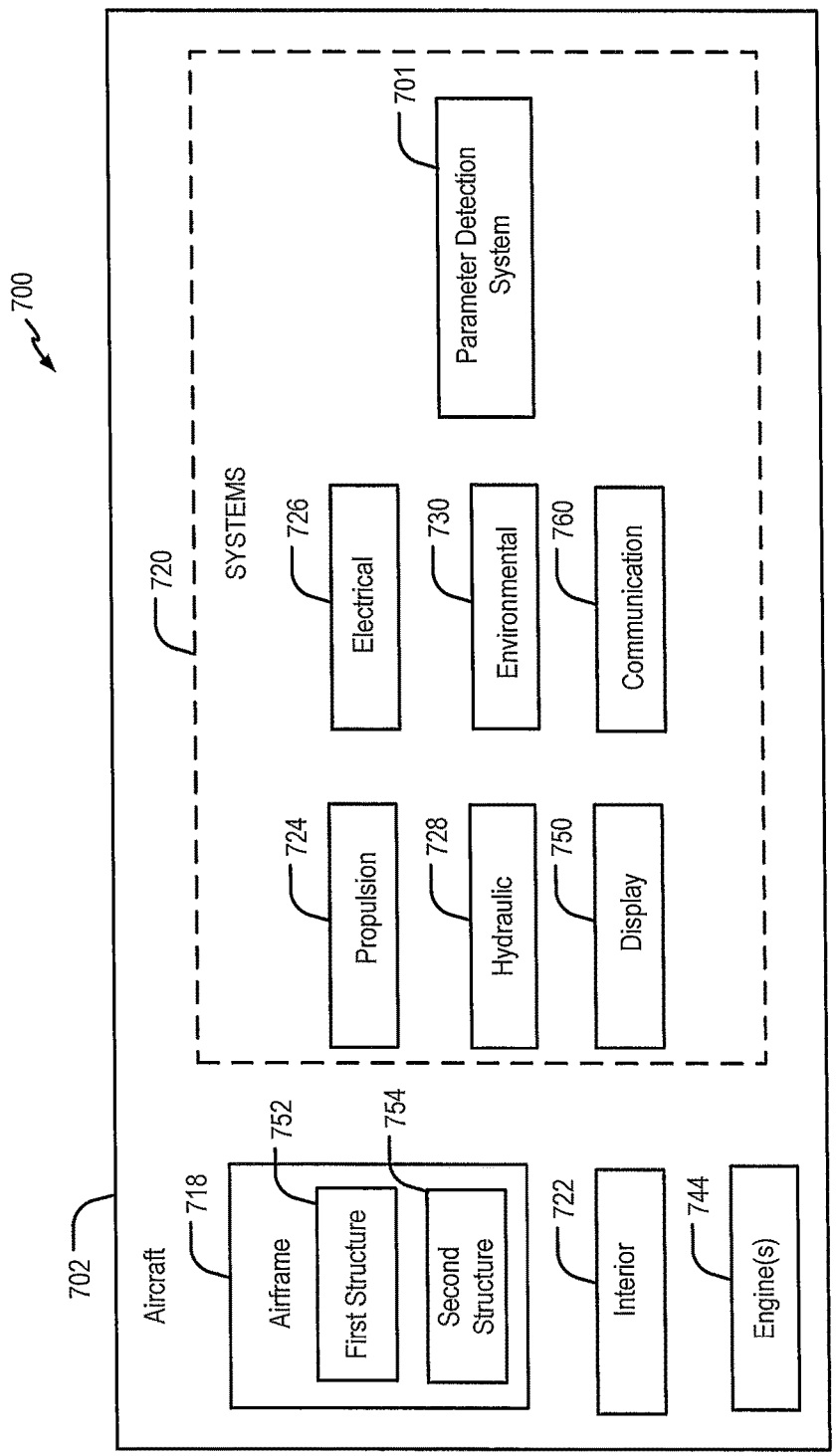
FIG. 7 is a block diagram of an illustrative embodiment of an aircraft that includes first and second structures with conformal coils and that includes a parameter detection system.

Referring to FIG. 7, a block diagram of an illustrative embodiment of an aircraft that includes an airframe 718 including a first structure 752 including a first coil conformed to a first surface of, or embedded within, the first structure 752 and a second structure 754 including a second coil conformed to a second surface of, or embedded within, the second structure 754 is shown and designated 700.

In an example, the first structure may correspond to the fuselage 102 of FIG. 1. In this example, the first surface may correspond to the surface 112 and the first coil may correspond to the coil 116 or the coil 118. As another example, the first structure may correspond to the wing 104. In this example, the first surface may correspond to the surface 124 and the first coil may correspond to the coil 130.

In an example, the second structure may correspond to the wing 104. In this example, the second surface may correspond to the surface 114 and the second coil may correspond to the coil 120 or 121. As another example, the second structure may correspond to the winglet 106. In this example, the second surface may correspond to the surface 126 and the second coil may correspond to the coil 128. Although the wing 104 and the winglet 106 are shown as examples of the second structure, the second structure may include other structures, such as an engine, a sensor pod, a radio, an antenna, etc. The second structure may be configured to couple to the first structure such that the first coil is aligned with the second coil to enable inductive coupling between the first coil and the second coil as described above.

As shown in FIG. 7, the aircraft 702 produced by the method 600 may include (in addition to the airframe 718) an interior 722, one or more engines 744, and a plurality of systems 720 including a parameter detection system 701.

The systems 720 may additionally include one or more of a propulsion system 724, an electrical system 726, a hydraulic system 728, an environmental system 730, a display system 750, and a communication system 760.

The parameter detection system 701 may include or may correspond to the processor 122 described above with reference to FIG. 1, and may be configured to detect a configuration of a second structure based on the parameter as described above. Any number of other systems may be included. Although an aerospace example is shown, the embodiments described herein may be applied to other industries, such as the automotive industry.

Apparatus and methods embodied herein may be employed during any one or more of the stages of the method 600. For example, components or subassemblies corresponding to production process 608 may be fabricated or manufactured in a manner similar to components or subassemblies produced while the aircraft 602 is in service, at 612 for example and without limitation. Also, one or more apparatus embodiments, method embodiments, or a combination thereof may be utilized during the production stages (e.g., elements 602-610 of the method 600), for example, by substantially expediting assembly of or reducing the cost of the aircraft 702. Similarly, one or more of apparatus embodiments, method embodiments, or a combination thereof may be utilized while the aircraft 702 is in service, at 612 for example and without limitation, to maintenance and service, at 614.

Examples described above illustrate but do not limit the disclosure. It should also be understood that numerous modifications and variations are possible in accordance with the principles of the present disclosure. Accordingly, the scope of the disclosure is defined by the following claims and their equivalents.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

What is claimed is:

1. An aircraft comprising:
    a first structure on the aircraft including a transmitter, a first surface, and a first coil conformed to a shape of the first surface or embedded within the first structure, wherein the first structure includes a plurality of first coils including the first coil;
    a second structure on the aircraft including circuitry, a second surface, and a second coil conformed to a shape of, or embedded within, the second surface, the second structure on the aircraft configured to couple to the first structure on the aircraft such that the first coil is aligned with the second coil to enable inductive coupling between the first coil and the second coil, wherein the transmitter is configured to transmit control signals to the circuitry via the first coil and the second coil; and
    a processor electrically coupled to the plurality of first coils, wherein the processor is configured to identify a first component of the circuitry based on an impedance of a particular first coil of the plurality of first coils.

2. The aircraft of claim 1, wherein the processor is configured to detect a configuration of the second structure based on which coils of the plurality of first coils are inductively coupled to corresponding coils of one or more second coils of the second structure, wherein the one or more second coils include the second coil.

3. The aircraft of claim 2, wherein the configuration indicates a number of electrical components in the second structure.

4. The aircraft of claim 2, wherein the control signals are generated based on the configuration.

5. The aircraft of claim 1, wherein the first component is a de-icing system.

6. The aircraft of claim 1, wherein the second structure further includes a third surface and a third coil conformed to a shape of, or embedded within the third surface, the aircraft further comprising a third structure including a fourth surface and a fourth coil conformed to a shape of, or embedded within the fourth surface, the third structure configured to couple to the second structure such that the third coil is aligned with the fourth coil to enable inductive coupling between the third coil and the fourth coil.

7. The aircraft of claim 6, wherein the circuitry includes a motor, and wherein the motor is configured to manipulate the third structure responsive to the control signals.

8. The aircraft of claim 6, wherein the third structure includes a wing flap.

9. The aircraft of claim 8, wherein the control signals are based on a roll rate of the wing flap.

10. A method of configuring an aerial vehicle, the method comprising:
    mating a first surface of a first structure of the aerial vehicle and a second surface of a second structure of the aerial vehicle such that a first coil conformed to a shape of the first surface or embedded within the first structure is aligned with a second coil conformed to a shape of the second surface or embedded within the second structure, the first structure including a transmitter, the second structure including circuitry, wherein the first structure includes a plurality of first coils including the first coil;
    causing a signal to be applied to the plurality of first coils or to the second coil such that the first coil and the second coil are inductively coupled;
    identifying a first component of the circuitry based on an impedance of a particular first coil of the plurality of first coils; and
    transmitting a control signal from the transmitter to the first component via the first coil and the second coil.

11. The method of claim 10, further comprising detecting a parameter associated with the first coil.

12. The method of claim 11, wherein the parameter corresponds to an effective impedance, a frequency of a time-varying signal, or a combination thereof.

13. The method of claim 11, further comprising configuring a system of the aerial vehicle based on the parameter.

14. The method of claim 10, wherein the first structure includes a fuselage of the aerial vehicle and the second structure includes a wing of the aerial vehicle.

15. The method of claim 10, further comprising:
    detecting a parameter associated with a feedback signal transmitted by the second coil in response to application of the signal to the second coil; and
    determining whether the first structure and the second structure are mated and aligned based on the parameter.

16. A method of manufacturing an aerial vehicle, the method comprising:
    forming a first coil conformed to a shape of a first surface of, or embedded within, a first structure of the aerial vehicle using a first direct write technique, the first structure including a transmitter electrically coupled to the first coil, wherein the first structure includes a processor electrically coupled to the transmitter, and wherein the first structure includes a plurality of first coils including the first coil, the plurality of first coils electrically coupled to the processor; and
    forming a second coil conformed to a shape of a second surface of, or embedded within, a second structure of the aerial vehicle using a second direct write technique, the second structure configured to couple to the first structure such that the first coil is aligned with the second coil to enable inductive coupling between the first coil and the second coil, the second structure including circuitry electrically coupled to the second coil, wherein the transmitter is configured to transmit control signals to the circuitry via the first coil and the second coil, and wherein the processor is configured to identify a first component of the circuitry based on an impedance of a particular first coil of the plurality of first coils.

17. The method of claim 16, wherein the first structure includes a fuselage of the aerial vehicle and the second structure includes a wing of the aerial vehicle.

18. The method of claim 16, further comprising hermetically sealing the first coil and hermetically sealing the second coil.

19. The method of claim 16, wherein the first direct write technique is a same technique as the second direct write technique.

20. The method of claim 16, wherein the first direct write technique is a different technique than the second direct write technique.

* * * * *